C. E. CLARK.
PUMPING POWER.
APPLICATION FILED NOV. 10, 1908.
1,017,739.
Patented Feb. 20, 1912.
3 SHEETS—SHEET 1.
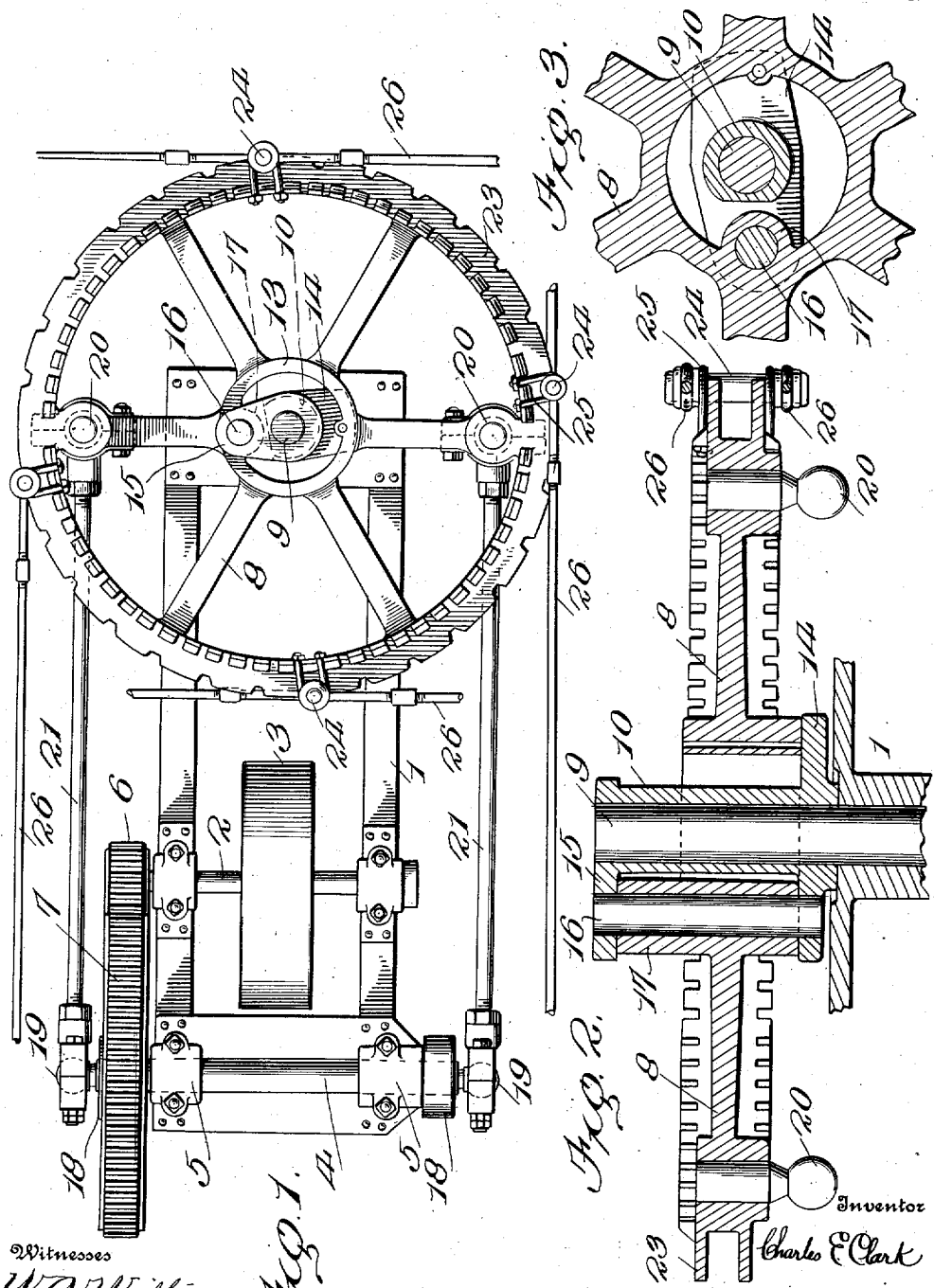
Witnesses
W. A. Williams
Henderson L. Hill
Inventor
Charles E. Clark
By
Robertson & Johnson
Attorneys

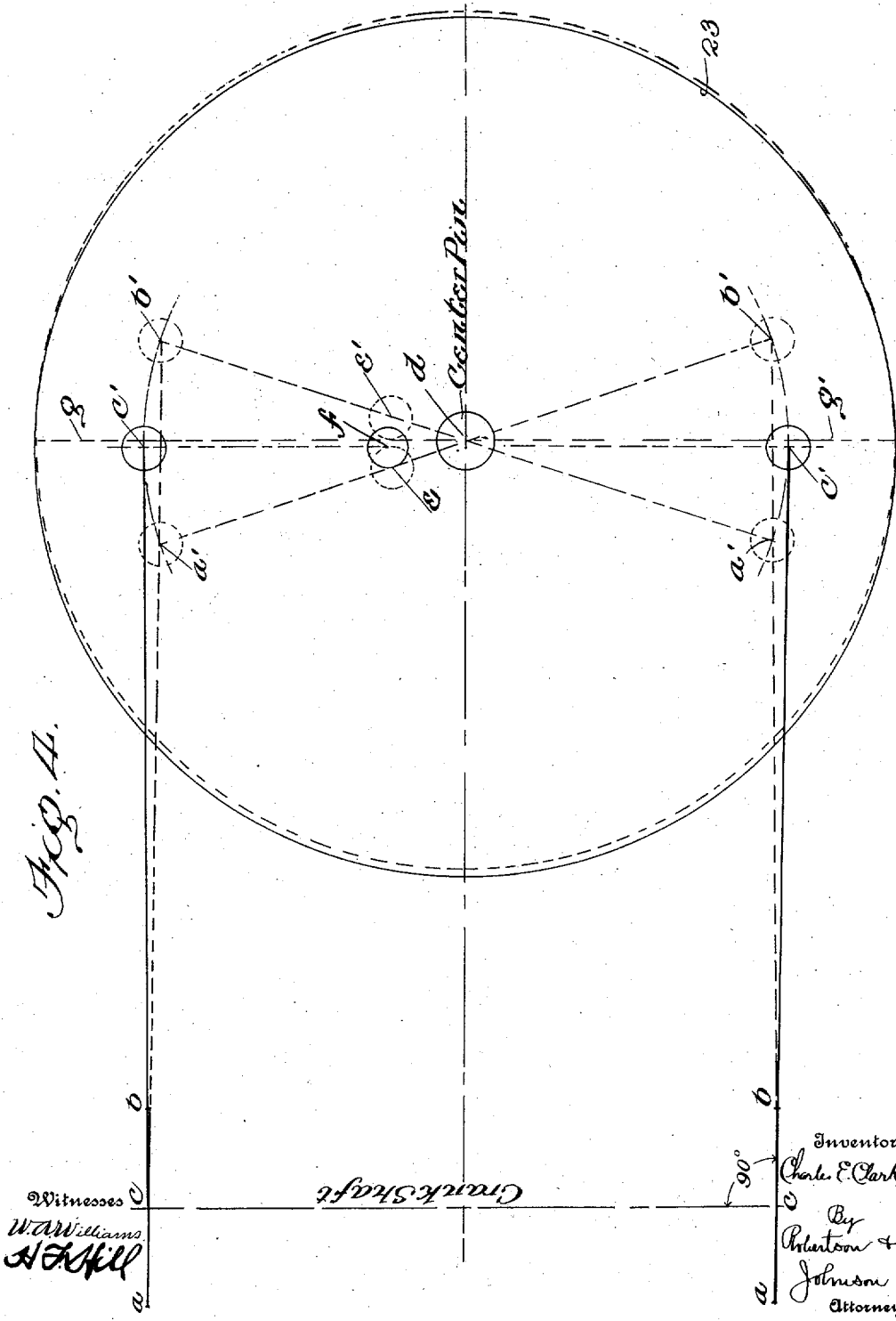

C. E. CLARK.
PUMPING POWER.
APPLICATION FILED NOV. 10, 1908.
1,017,739.
Patented Feb. 20, 1912.
3 SHEETS—SHEET 3.
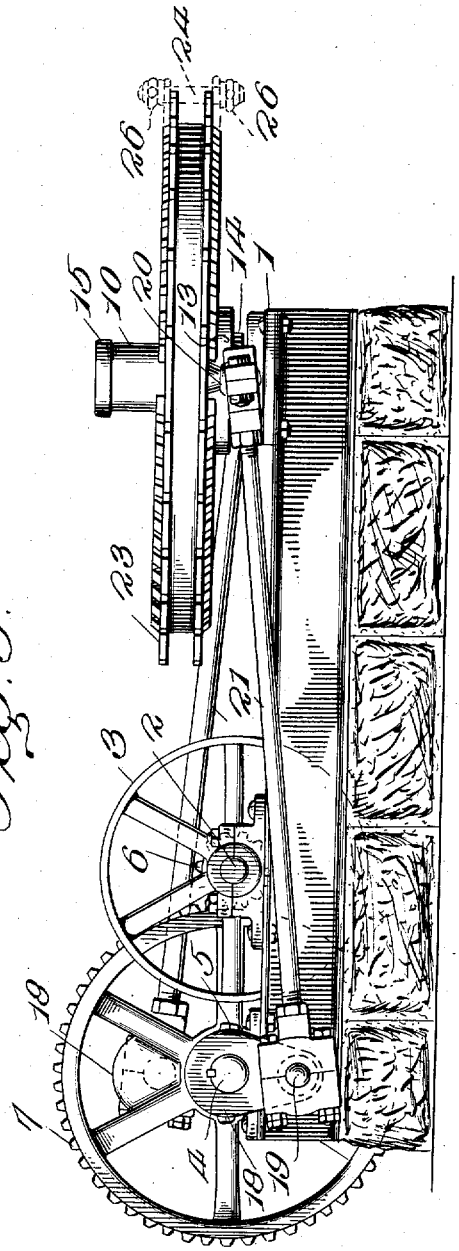
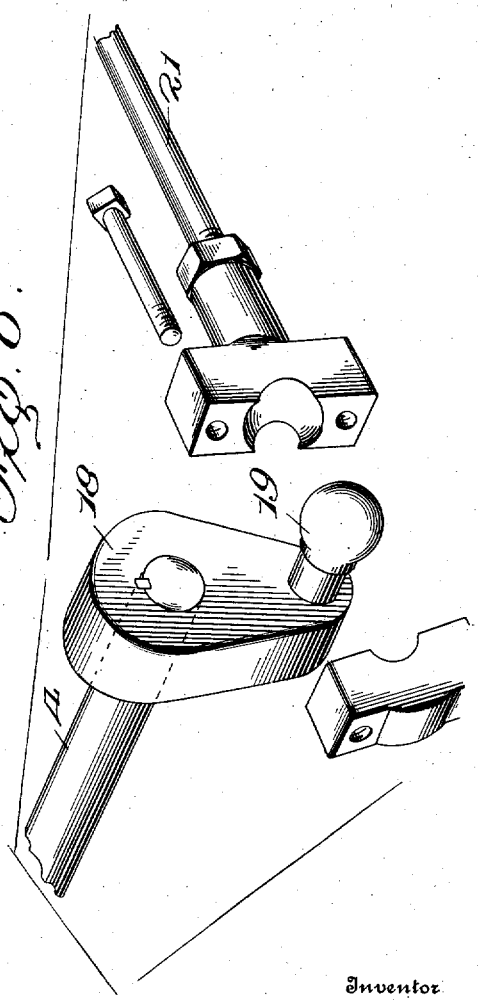
Witnesses
W. A. Williams
Henderson F. Hill
Inventor
Charles E. Clark
By Robertson & Johnson
Attorneys

UNITED STATES PATENT OFFICE.

CHARLES E. CLARK, OF WELLSVILLE, NEW YORK.

PUMPING-POWER.

1,017,739. Specification of Letters Patent. Patented Feb. 20, 1912.

Application filed November 10, 1908. Serial No. 461,930.

*To all whom it may concern:*

Be it known that I, CHARLES E. CLARK, a citizen of the United States, and a resident of Wellsville, in the State of New York, have invented certain new and useful Improvements in Pumping-Powers, of which the following is a specification.

My invention relates to powers, particularly pumping powers. In apparatus of this character it is usual to transmit motion from a continuously driven shaft to an oscillating master wheel by a single crank and suitable connections. This arrangement causes a severe strain on the center pin on which the master wheel is pivoted. To obviate this difficulty I have provided the crank shaft with a second crank arranged oppositely to the other crank and connected to the master wheel at a point opposite the connection to the other crank, thus making a balanced construction and minimizing friction. The arrangement just described does not however of itself avoid the difficulty known as the "quarreling" of the connecting rods, which, as will appear more clearly hereinafter, are shorter or do not reach so far in a direction at right angles to the crank shaft at the quarter or mid stroke when they extend at an angle to said direction, as they do at the extreme or dead center positions when they coincide with said direction. This shortening of the connections tends to move the master wheel bodily toward the crank shaft, and, if the master wheel is mounted in the ordinary way and is provided with immovable wrist pins, the center pin on which the master wheel is mounted is subjected to a very severe strain. I avoid this by making the operative connections automatically compensating, either by so constructing the connections that they will lengthen automatically at mid stroke, or by so mounting the master wheel that the distance between it and the crank shaft will automatically shorten at mid stroke to compensate for the shortening of the connections. The wrist pin or other connection between the pitman and the master wheel may be so mounted as to be capable of automatic movement to lengthen the connections, or the master wheel may be mounted so as to be capable of bodily movement toward the crank shaft.

To the end above set forth my invention consists in an automatically compensating power more particularly set forth in the claims appended hereto and one form of which is illustrated and described in this application.

Referring to the drawings; Figure 1 is a plan view of my power. Fig. 2 is a vertical section through that diameter of the master wheel on which are located the centers of the wrist pins. Fig. 3 is a horizontal section through the hub of the master wheel and adjacent parts illustrating the manner in which the wheel is mounted. Fig. 4 is a plan view showing diagrammatically the movement of the parts. Fig. 5 is a side elevation of my power. Fig. 6 is a perspective view of the crank wrist pin and related parts.

In the figures thus briefly described 1 is the frame and 2 the driving shaft provided with the pulley 3 by which it is driven.

4 is a crank shaft journaled in suitable bearings 5 in the frame 1.

6 and 7 represent the gearing through which the shaft 2 drives the shaft 4.

8 is a master wheel mounted in the following manner. The frame 1 has an upright immovable center pin 9 on which is journaled by its sleeve 10 a rocker frame. This sleeve extends through an aperture 12 in the hub 13 of the master wheel 8 and is provided with a base plate 14 on which rests the hub of the master wheel and with a corresponding projection 15. The base 14 and the projection 15 are provided with registering holes into which is tightly driven (preferably by hydraulic power) the oscillating pin 16. The master wheel 8 is provided with a sleeve 17 integral with its hub 13 the bore of which is of slightly greater diameter than that of the pin 16. Before the pin 16 is forced into the holes in the projection 15 and base 16 of the rocker frame the said frame is put through the aperture 12 in the hub 13 of the master wheel 8 and the bore of the sleeve 17 of the master wheel is placed in registry with the holes in the parts 14 and 15. The pin is then forced into position and the rocker frame with the master wheel is placed upon the center pin 9. It will be apparent that the rocker frame and all the parts mounted thereon including the master wheel are capable of oscillation about the center of the pin 9. It will also be clear that the master wheel in addition to being capable of such oscillation is capable of oscillation about the center of the pin 16 on which as stated it is loosely mounted.

Universal operative connections are provided between the crank shaft and the master wheel. The shaft 4 is provided with two cranks 18 set 180° apart, one on each end of the shaft. Each of these cranks is provided near its end with a wrist pin 19. The master wheel 8 is provided with two wrist pins 20 set 180° apart on the same diameter of the master wheel. All these wrist pins are ball pins. A pitman 21 connects the wrist pin on the crank with the corresponding wrist pin on the master wheel and these pitmen are provided each end with spherical sockets 22 forming with the ball wrist pins universal joints. This mounting provides for the transverse movement of the ends of the pitmen resulting from the movement of these wrist pins on an arc.

The master wheel which may obviously be a segment, a plate, or a skeleton frame, has teeth 23 in its periphery in which are mounted pins 24 by means of U-shaped connecting bolts 25. Pumping rods 26 are connected to these pins. The construction just described is the customary one and enables the power to be applied in any direction, since the pins may be attached between any pairs of teeth throughout the circumference of the wheel.

The object of my invention and of the particular construction above described in which I have embodied it has already been briefly stated. The nature of the difficulty and the manner in which I have met it will however be clearer on reference to Fig. 4 of the drawings and in view of the following explanation: In this diagrammatic figure $a$ represents the position of the wrist pins 19 at the outer extreme or dead center position and $a'$ the position of the centers of the wrist pins 20 at the same point in the stroke. $b$ represents the position of the centers of the wrist pins 19 at the inner extreme or dead center position, and $b'$ represents the position of the centers of the wrist pins 20 at the same point in the stroke. It will be noted that the lines $a\ a'$ and $b\ b'$ are both at right angles to the axis of the crank shaft. $c$ represents the position of the centers of the wrist pins 19 at the quarter or mid stroke position. $c'$ represents the position of the centers of the wrist pins 20 at the same point in the stroke. It will be noted that the lines $c\ c'$ do not extend at right angles to the axis of the crank shaft, and it will therefore be obvious that the points $c'$ will be nearer to the crank shaft than they would be if the line $c\ c'$ lay in the same vertical plane with the lines $a\ a'$ and $b\ b'$. From what has been said it will be clear that in the operation of one of these powers, there is at mid-stroke a tendency to move the entire master wheel toward the crank shaft in a line at right angles thereto. This will be apparent from Fig. 4, the diagrammatic view, in which the planes $a'\ b'$ bisecting the master wheel also pass through the axis $d$ of the pin 9, but in which the plane $c'\ c'$ bisecting the master wheel and passing through the centers of the wrist pins 20 at mid stroke does not pass through the axis $d$ of the center pin 9 but is displaced toward the crank shaft.

To avoid undue strain on the parts and to obviate the difficulty described, I either provide a construction in which the connections may automatically lengthen at the points in the stroke at which they would otherwise be too short, which may be done by making the wrist pins 20 movable with respect to the master wheel, or I make the master wheel bodily movable automatically toward the crank shaft so that as the connections shorten the distance shortens. In the preferred embodiment of the invention illustrated in this application I have avoided the difficulty by the latter means.

$e$ represents the position of the center of the oscillating pin 16 at the outer dead center point in the stroke. $e'$ represents the position of the center of the said pin at the inner dead center point in the stroke. $f$ represents the position of the center of the said pin at the mid stroke.

$g\ g'$ represents a plane parallel with the crank shaft and containing the axis $d$ of the center pin 9. The plane $c'\ c'$ is in advance of the plane $g\ g'$ in the direction of the crank shaft and passes through the axis $f$ of the oscillating pin 16.

The construction I have illustrated and described leaves the pin 16 free to oscillate about the center pin 9. And it will readily be apparent that at mid-position the pull on both wrist pins will cause the master wheel 8 to rock the rocker frame and oscillate the pin 16 the necessary distance toward the crank shaft. At each dead center position the wheel and rocker frame return to the position in which the plane bisecting the master wheel and passing through the axes $a'\ b'$ of the wrist pins 20 also passes through the axis $d$ of the center pin 9. This is true whether the connections are constructed to lengthen automatically or the wheel so mounted that the distance shortens automatically.

It will be apparent that my invention results in a construction minimizing friction and doing away with unnecessary strain and that it has the advantage of simplicity and strength.

What I claim as new is:

1. In apparatus of the character described, a crank shaft, means for rotating said crank shaft, oppositely set cranks on said shaft, a master wheel mounted for oscillation about its center, inelastic operative connections between said shaft and wheel comprising a pair of pitmen universally connected to said respective cranks and universally connected to opposite sides of said master wheel, said connections simultaneously tending to shorten at certain parts of the stroke and to lengthen at others, and means to compensate for this tendency.

2. In apparatus of the character described, a crank shaft, means for rotating said crank shaft, oppositely set cranks on said shaft, a master wheel mounted for oscillation about its center and lying in a plane at right angles to the planes of the cranks, inelastic operative connections between said cranks and wheel comprising a pair of pitmen universally connected to said respective cranks and to opposite sides of the master wheel, the connection between each pitman and the master wheel comprising a universal joint, and means for alternately increasing and decreasing the travel of one of said joints during a stroke while alternately decreasing and increasing the travel of the other of said joints.

3. In apparatus of the character described, a horizontal crank shaft, a vertical pin, a master wheel mounted for oscillation about the said pin, and universal inelastic operative connections between said crank shaft and master wheel comprising a pitman and a universal joint in the connections between said pitman and master wheel having a point located at one part of the stroke in a diameter of the master wheel through the axis of said pin and at another part of the stroke in a line parallel to the said diameter but nearer the crank shaft than the axis of said pin, and means for causing the joint to change its position automatically during the stroke to vary the location of the point as stated.

4. In apparatus of the character described, a crank shaft, means for rotating said shaft, a master wheel, a center pin on which said master wheel is mounted for oscillation, oppositely located wrist pins supported from the wheel, operative connections between said crank shaft and pins, the location and mounting of the parts being such that the plane through the wrist pin centers contains the axis of the center pin at the extreme or dead center points of the stroke but is in advance of the said axis at mid or quarter stroke.

5. In apparatus of the character described, a crank shaft, means for rotating said shaft, a master wheel mounted for oscillation about a fixed center at a distance from said crank shaft, and connections between said shaft and wheel for oscillating the latter said wheel being also free to move bodily and automatically toward said crank shaft in the operation of the machine.

6. In apparatus of the character described, a frame, a crank shaft journaled therein, means for rotating said shaft, a master wheel mounted for oscillation about a fixed center at a distance from said crank shaft, a bearing eccentric to said fixed center and to said master wheel and on which said master wheel is mounted for oscillation, and universal connections between said crank shaft and master wheel to cause said oscillation and move the axis of the master wheel into a position in which it contains said fixed center and out of that position.

7. In apparatus of the character described, a frame, a crank shaft journaled therein, means for rotating said shaft, oppositely set cranks on said shaft, a fixed bearing at a distance from said crank shaft, a rocker frame mounted for oscillation thereon, a master wheel mounted eccentrically with reference to itself on said rocker frame lying in a plane at right angles to the planes of the cranks, and a pair of pitmen universally connected to said respective cranks and to opposite sides of said master wheel.

8. In apparatus of the character described, a frame, a horizontal crank shaft journaled therein, means for rotating said shaft, a vertical pin, a master wheel lying in a horizontal plane and mounted for oscillation about said pin, universal connections between said crank shaft and master wheel, and means for moving the axis of the wheel into and out of the axis of the pin.

9. In apparatus of the character described, a frame, a crank shaft journaled therein, means for rotating said shaft, a fixed pin on said frame at a distance from the crank shaft, a rocker frame mounted for oscillation on said pin, a master wheel having an open hub surrounding said pin and spaced therefrom, said master wheel being mounted for oscillation on said rocker frame on an axis eccentric to said wheel, and universal connections between said crank shaft and master wheel.

10. In apparatus of the character described, a frame, a crank shaft journaled therein, means for rotating said shaft, a rocker frame mounted for oscillation on said first frame at a distance from said crank shaft, a master wheel mounted for oscillation on said rocker frame on a bearing eccentric to the master wheel, oppositely set cranks on said crank shaft, and a pair of pitmen universally connected to the respective cranks and to opposite sides of the master wheel.

11. In apparatus of the character described, a frame, a crank shaft journaled therein, means for rotating said shaft, a rocker frame mounted for oscillation on said frame on a center distinct from said crank shaft, a pin fixed in said rocker frame, a master wheel mounted for oscillation on said pin and having an open hub surrounding and spaced from a part of said rocker frame which extends therein, and universal operative connections between the crank shaft and master wheel.

12. In apparatus of the character described, a frame, a crank shaft journaled therein, means for rotating said crank shaft, a fixed bearing at a distance from said crank shaft, a rocker frame constituting a yoke mounted for oscillation thereon, a master wheel mounted between the arms of the yoke for oscillation on said rocker frame, oppositely set cranks on said crank shaft, and a pair of pitmen universally connected to the respective cranks and to opposite sides of the master wheel.

13. In apparatus of the character described, a frame, a horizontal crank shaft journaled therein, means for rotating said shaft, a stationary vertical pin on the frame, a rocker frame mounted for oscillation on the pin, a wheel mounted for oscillation with respect to said rocker frame in a horizontal plane, said frame having an extension supporting the wheel at a distance from the axis about which it oscillates with respect to the rocker frame, and operative connections between said crank shaft and wheel.

Signed by me at Wellsville New York, this 9th day or November 1908.

CHARLES E. CLARK.

Witnesses:
INEZ FARNUM,
WM. R. VAN CAMPEN.